Nov. 13, 1962          H. G. TASKER          3,063,634
METHOD AND APPARATUS FOR AIR TRAFFIC CONTROL
Filed July 10, 1958          3 Sheets-Sheet 2
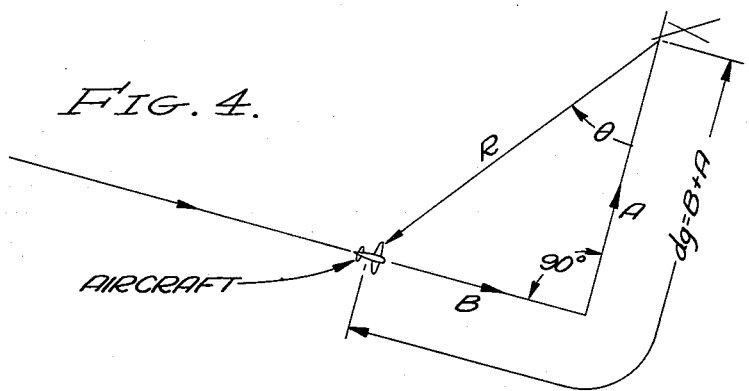
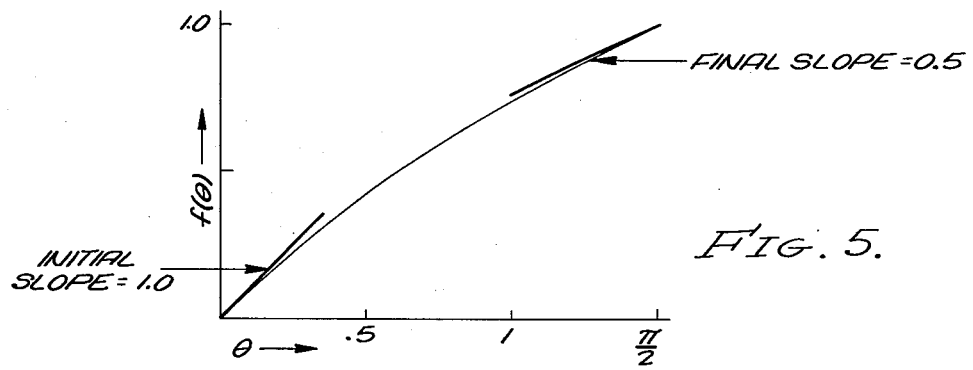
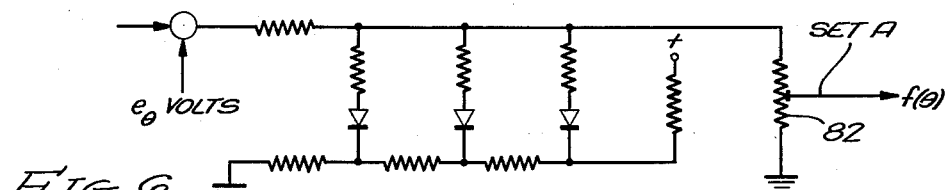
$f(\theta) = A(1 + \tan \theta - \sec \theta)$
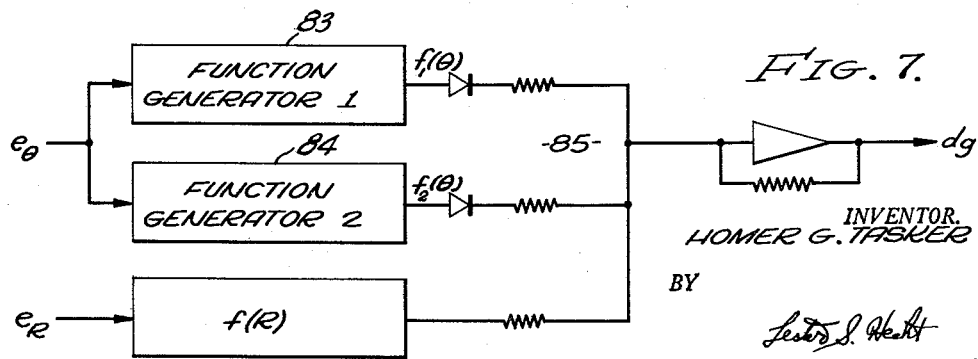
INVENTOR.
HOMER G. TASKER
BY
Lester S. Hecht
ATTORNEY

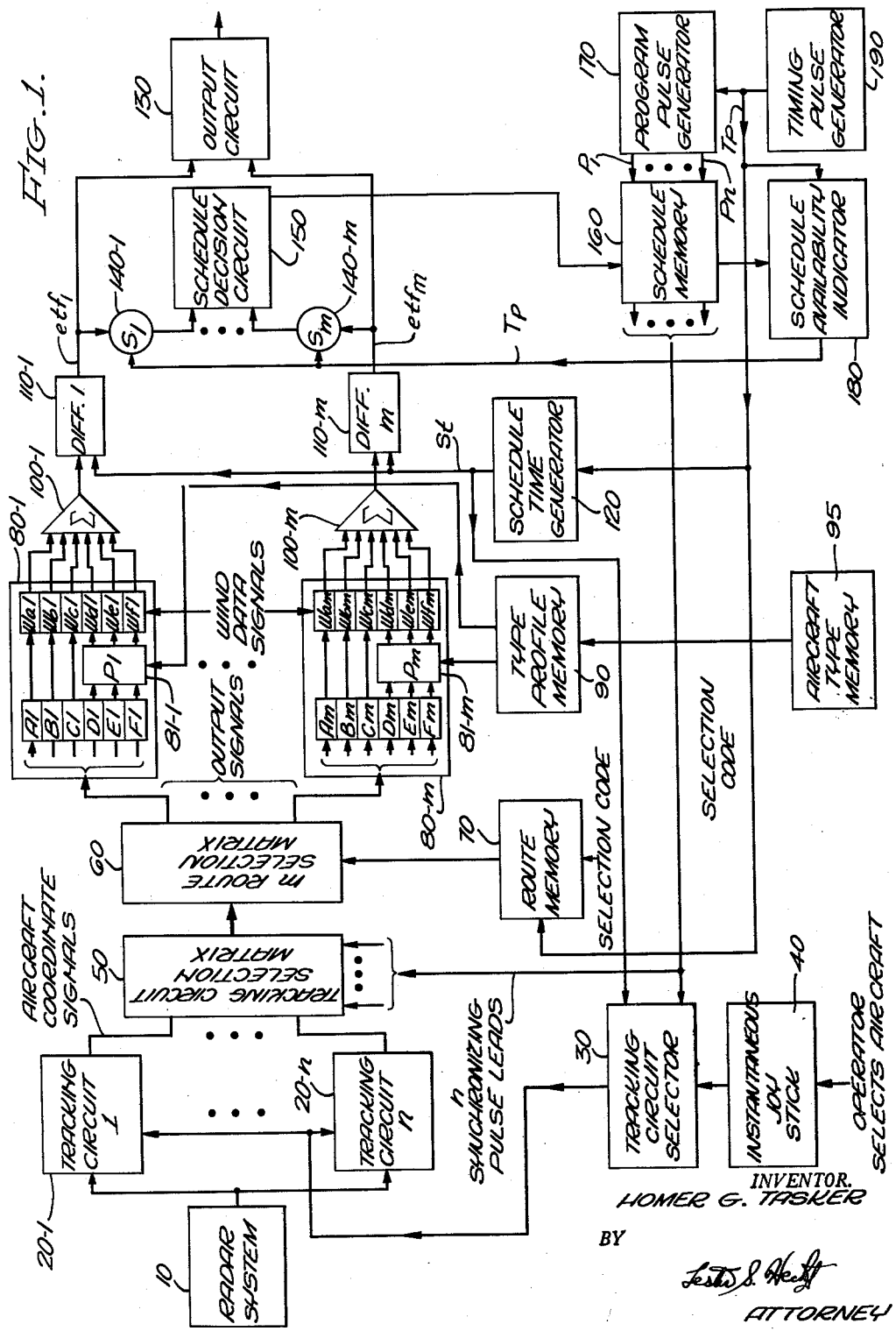

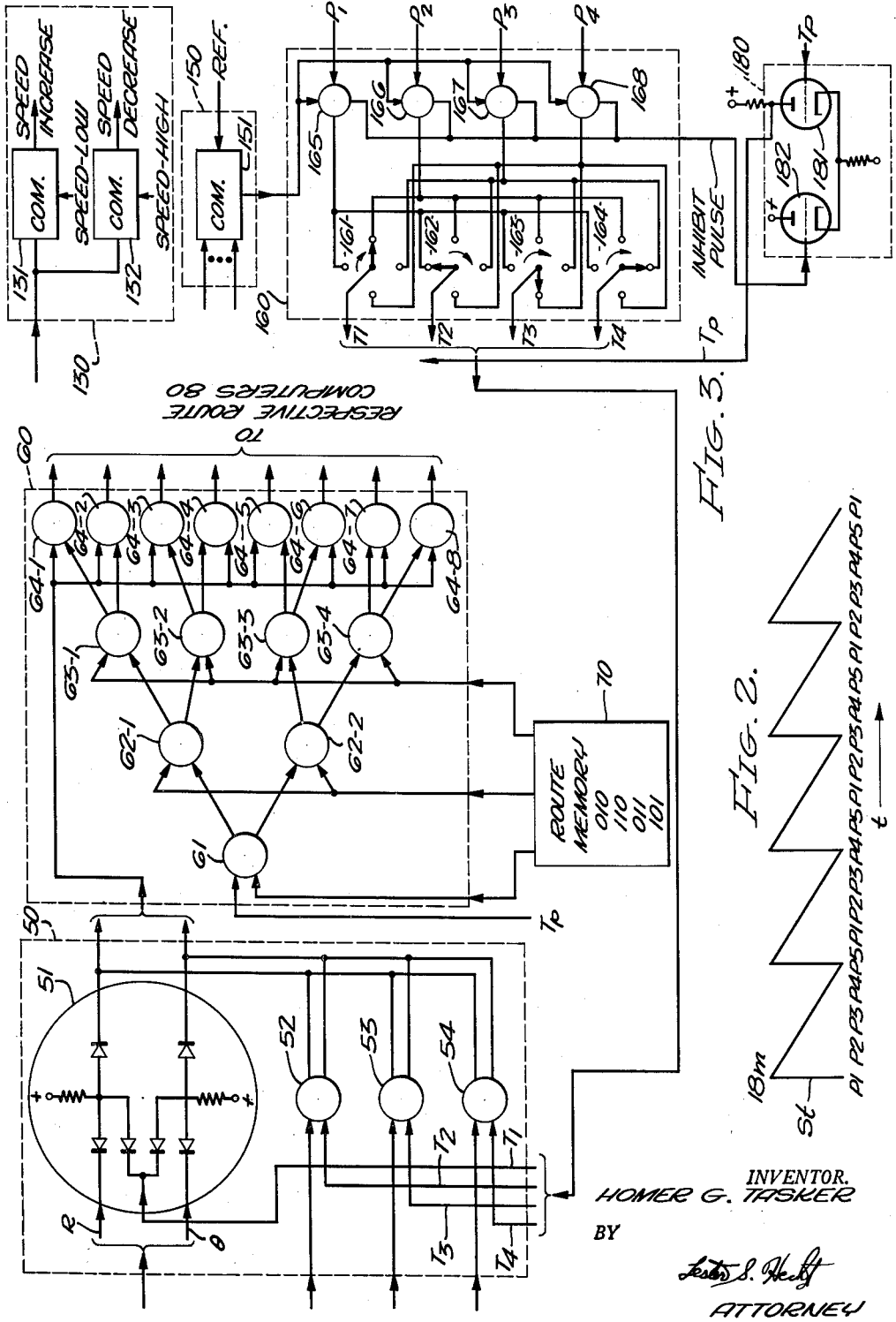

United States Patent Office 3,063,634
Patented Nov. 13, 1962

3,063,634
METHOD AND APPARATUS FOR AIR
TRAFFIC CONTROL
Homer G. Tasker, Los Angeles County, Calif., assignor
to Tasker Instruments Corporation, Van Nuys, Calif.,
a corporation of California
Filed July 10, 1958, Ser. No. 747,631
24 Claims. (Cl. 235—151)

This invention relates to a method and apparatus for aircraft flight scheduling, and more particularly, to a method for controlling the flights of various aircraft along fixed assigned air routes so that each aircraft flies according to an assigned schedule to insure avoidance of air collisions.

The invention has been developed in particular to solve the problem of the so-called "terminal-flow bottleneck" which exists, as an illustration, in the present operation of the civil airways. Under present conditions an increase in the air traffic load is compensated for by stacking the aircraft; that is, by holding various aircraft at different altitudes in a waiting sequence. This means that the basic flow rate for landing aircraft is substantially reduced and communications to the aircraft are increased exponentially since a great number of planes are held in waiting.

The guidance problem for the civil air ways is much more complicated than the military problem where schedules may be met by wide route variations in approach, as is described in Patent No. 2,825,054 by N. L. Ernst; and where the scheduling problem is simplified by the fact that it is only the spacing in time between aircraft that is important; whereas the approach problem in a dense civil terminal area involves multiple, intersecting airway paths with continuous arrivals and departures at one or several airports, plus rigorous spatial separation of each aircraft from all others to maintain safety. Consequently, it will be shown in the following that the present invention is characterized by its provision for strict adherence to the complex civil air ways routes, with only very minor exceptions for path-stretch maneuvers, and further is characterized by provision for a primary control in relaxed incremental speed control, where speed variations are not continuously prescribed but only after certain schedule time variation limits are surpassed. The military control is the exact complement since path variation maneuvers are the primary control and speed variations are generally prohibited.

Other patents concerned with the miliary problem are No. 2,588,930 by Kendall, et al.; No. 2,709,252 by Tasker of the present application; No. 2,821,704 by N. D. O'Day; and No. 2,927,751 by J. I. Daspit, who has filed another application on civil air traffic control Serial No. 824,843, such application being also assigned to the Tasker Instruments Company as is the present application.

Furthermore, the conventional military approach cannot be followed where aircraft are to be guided to a plurality of different airports. In this case, even the military approach path must be fixed in certain respects.

Accordingly, the prior art control systems are not appropriate for the multiple airport or fixed route situation as particularly exemplified in the civil air traffic control problem, and it is, therefore, the primary object of the present invention to provide a method and appropriate apparatus for guiding an aircraft along a fixed route to a destination point according to a time schedule which will insure that there will be no collision with any other aircraft.

Another object of the invention is to provide a method for accomplishing the simultaneous control of a plurality of aircraft, perhaps greater than 100, at a single time, so that each aircraft may be assigned to a particular time schedule for arrival along one or several fixed air routes to a common point.

Another problem in air traffic control is the effect of wind. If the aircraft are scheduled for arrival at a particular time without accounting for the wind, the wind velocity vector along the various legs of the particular route may make it difficult or even impossible to conform to the schedule so determined.

Accordingly, another object of the invention is to compute scheduled time for aircraft considering the effect of all wind velocity vectors along all the various legs of the route or routes to a common destination point.

Another object of the invention is to provide a simple means for computing the distance remaining along a fixed air route for an aircraft, and one which is adaptable for high speed switching to permit a similar control of a large number of similar aircraft.

A further object of the invention is to provide a route computer for an air traffic control system wherein each leg of the flight of each aircraft is computed by simple means as a function of the aircraft's coordinates measured from a radar scanning station.

A still further object of the invention is to provide a method for accurately scheduling the time for arrival of a plurality of aircraft at substantial distances from their respective destinations, taking into account the various types of aircraft which may be involved, the particular fixed air routes which they are to follow, the effect of wind along the respective routes, and the air speed of the particular craft.

A specific object of the invention is to provide an aircraft control system wherein simple high speed analogue computers may be time shared at high speed by a pulse selection technique which identifies the aircraft to be controlled, its respective route, and its scheduled time for arrival at a predetermined destination.

Another specific object of the invention is to provide an air traffic control system wherein high speed decisions may be made respecting a plurality of different aircraft flying different civil air routes with respect to their ability to meet certain scheduled times for arrival and then, once that decision is made, to guide the aircraft through its schedule.

The novel features which are believed to be characteristic of the invention, both as to its organization and method of operation, together with further objects and advantages thereof will be better understood from the following description considered in connection with the accompanying drawings, in which several examples are illustrated. It is to be expressly understood, however, that the drawings are for the purpose of illustration and description only, and are not intended as a definition of the limits of the invention.

FIG. 1 is a block diagram of an air traffic control system according to the invention;

FIG. 2 is a time sequence diagram illustrating the time relationship between a suitable scheduled time to arrive signal and the synchronizing or program pulses of FIG. 1;

FIG. 3 illustrates one suitable form for the embodiment of FIG. 1;

FIG. 4 shows a 90° route defined in polar coordinates;

FIG. 5 is a graph of a typical $f(\theta)$ function permitting a linear summation of signals for route measurement, according to the invention;

FIG. 6 is a schematic diagram of one form of circuit for computing the function $f(\theta)$ defined according to the invention; and FIG. 7 is a schematic diagram indicating one form of analogue computer for a two-leg route.

Reference is now made to FIG. 1 wherein a block diagram of a system arranged according to the present invention is shown. As indicated, a radar system 10 provides system coordinate signals such as range R and scanning angle $\theta$ or X and Y signals, for a plurality of tracking circuits 20-1 ... 20-n, there being one tracking circuit associated with each aircraft to be guided. The tracking circuits are initially set to track a particular aircraft through selector circuit 30, which passes signals derived from instantaneous joy stick 40 corresponding to the coordinates of the aircraft to be tracked. The operator sets the joy stick of circuit 40 so that the display associated therewith indicates that the desired target information is being read into tracking circuit selector 30. Radar system 10 may be a conventional system. Typical tracking systems suitable for circuits 20 are found in Patent No. 2,867,788 for Object Locating Systems; No. 2,877,354 for Radiation Tracker for Aiming at Center or Centroid of Multiple Targets; and 2,881,356 for Position Indication Method and System. Tracking circuit selector 30 may be a conventional switching arrangement such as shown in Patent No. 2,872,114 for Selecting Circuit. And, instantaneous joy stick 40 may be obtained through the use of a conventional display arrangement such as is shown in Patent No. 2,869,028 for Oscilloscopic Display Method or Means.

The n output signals of tracking circuits 20 are applied to a tracking circuit selection matrix 50 which also receives n synchronizing pulse leads corresponding to n schedule or program pulses, respectively.

The output signal of matrix 50 then contains the coordinate information respecting the aircraft on a particular schedule designated by the synchronizing or program pulses. This signal is applied to a second matrix 60 for selecting among the m routes which the various aircraft may follow. Matrix 60 is controlled by a route memory 70 which receives a selection code identifying the route of each aircraft controlled. Route memory 70 then controls matrix 60 so that the coordinate signals derived from matrix 50 are applied to the proper route computer 80. This means that memory 70 must control matrix 60 in synchronism with the corresponding schedule pulse applied to matrix 50, so that the proper route is associated with the aircraft which is being scheduled at the particular time.

It will be noted that each of route computers 80 (there being m computers corresponding to m possible routes) contains a plurality of leg computers A, B, C, D, E and F. Each leg computer is arranged to determine the distance $dg$ along a particular portion of the route for the aircraft. A few examples of these circuits are given below, but in general they may be simple linear function generators producing output signals which may vary directly as a function of the input coordinate signals applied thereto.

As an illustration of a typical mechanization of computer 80, leg computers A, B and C are associated with respective wind correction computers WA, WB and WC, each of which receives a wind data signal indicating the wind velocity vector along the particular leg of the route. In addition legs D, E and F in each computer are associated with a profile computer 81 which receives control signals from a profile type memory 90 actuated according to a predetermined selection code provided by aircraft type memory 95. The profile computers are arranged to compensate for the fact that various types of aircraft will follow the same civil air route, but at different altitudes and speeds. The selection code actuating memory 90 identifies the type of aircraft being followed by the tracking circuit which then supplies data for computers 80.

Profile computer 81 may be the same type of analogue circuit as is employed for computer 80. Its essential function is to modify the leg computation for higher altitudes according to the type of aircraft indicated by the signal generated by memory 95. The memory which is employed for profile or aircraft type storage may be of the magnetic core type such as is shown in Patent No. 2,869,112 for Coincidence Flux Memory System, of the magnetic drum type such as is shown in Patent No. 2,877,450 for Data Transfer System, of the cathode ray storage type such as is shown in Patent No. 2,871,401 for Method for Storing Information in an Electronic Storage Tube, or of the delay line type such as is shown in Patent No. 2,867,789 for Mercury Memory Tank. Schedule time generator 120 may be a conventional sweep generator circuit such as is shown in Patent No. 2,875,334 for Sweep Voltage Generator; and, the pulse generators may be of the type shown in Patent No. 2,878,381 for Pulse Generator.

The output signals of each computer 80 are summed in an associated summing amplifier 100. The output signals of amplifiers are scaled to time according to some predetermined air speed that all aircraft are expected to follow during the final approach. This results in a time signal which may be referred to as the actual flight time remaining along a particular route. The time signal thus produced is applied to an associated difference circuit 110, which also receives a schedule time signal from a generator 120. The signal produced by generator 120 represents the amount of schedule time remaining for the particular aircraft along its flight and thus difference circuits 110 produce error signals $e_{tf}$ indicating the discrepancy between the actual flight time to the destination and the scheduled time. These error signals are applied to an output circuit 130 which may produce a speed correction signal as is discussed further below.

Error signals $e_{tf}$ are also applied through respective switching circuits 140 to a schedule decision circuit 150 wherein the initial decisions are made as to whether or not an aircraft can make a particular schedule. Circuit 150 produces an output signal which controls a schedule memory 160 to permit the passage of program pulses produced by a generator 170 to the proper tracking circuit for the aircraft on the particular schedule.

Whenever a schedule is filled, memory 160 passes an inhibit signal to schedule availability indicator circuit 180 to prevent the passage of a timing pulse $T_p$ from generator 190 to schedule decision circuit 150. This means that once a schedule is filled, in a manner which will be discussed further below, the schedule availability indicator will inhibit the passage of any timing pulses $T_p$ to schedule another aircraft for the same time.

It should be understood that while a system as shown in FIG. 1 is suitable for practicing the invention automatically, in fact the general method of the invention does not require the complexity of this system but may be operated to a great extent by hand through the manual control of various instruments. The following description therefore relates to the general method of the invention and the reference to FIG. 1 is only for the purpose of clarifying the description, since the invention is not limited to the use of the system.

The method of operation will be described with reference to the time diagram of FIG. 2 where one suitable form of schedule time signal $St$ is shown in an illustrative case where it is assumed that only five schedule or program pulses $P_1$, $P_2$, $P_3$, $P_4$ and $P_5$ are available corresponding to five time schedules. As indicated in FIG. 2 waveform $St$ is essentially a recurring sawtooth signal where the maximum amplitude represents the maximum schedule time to arrive at the destination. This time is illustrated to be 18 minutes. During the first cycle of signal $St$ it will be noted that program pulse $P_1$ coincides in time with the 18 minute amplitude of signal $St$. This would mean that if an aircraft is associated with program pulse $P_1$ its time to arrive is then 18 minutes. Then it will be noted that the pulse $P_1$ coincides with 13.5 minutes during the second cycle corresponding to a decrease in scheduled time to arrive by 25%. In the next cycle there is a coincidence between pulse $P_1$ and the nine minute marker of waveform $St$ indicating the half-way point of the schedule. The next coincidence is at the 4.5 minute marker, and finally the last cycle shows the coincidence between the zero scheduled time to go and pulse $P_1$ indicating that the aircraft should have reached its destination and that this schedule time is now available for another aircraft.

It will be understood that it is not necessary to use the single recurring waveform in this manner since a plurality of schedule-time-to-arrive generators may be employed, each one being actuated in response to the scheduling of an associated aircraft. In particular this could be accomplished by actuating a series of stepping relays, each of which could be associated with a linear potentiometer for producing a linear descending ramp signal indicating the scheduled time to go for the particular aircraft. That is, the associated stepping relay would be stepped down by successive timing pulses $T_p$ until the schedule time is zero. Further operation of the particular stepping relay would then be deferred until another aircraft was assigned that schedule.

It should also be understood that in fact signal $St$ need not be generated at all if means is provided for the operator to keep track of the scheduled time to go and to compare this time with the actual flight time remaining on the route.

In order to illustrate a particular scheduling operation it will be assumed at the outset that the schedule represented by pulse $P_1$ has not yet been filled. The operator then may note that a particular aircraft is in the neighborhood of between 15 and 18 minutes from the destination, along the respective route. The operator then causes schedule memory 160 to select program $P_1$. If this pulse is available, schedule availability indicator 180 permits that passage of a timing pulse $T_p$ to switches 140. This then permits the error signal $e_{tf}$ to pass to schedule decision circuit 150. If the difference between the aircraft time for arrival and the schedule time, as represented by signal $e_{tf}$, is small enough, decision circuit 150 produces a signal which holds circuit 160 at a position where pulses $P_1$ will then pass continuously through the memory to tracking circuit selection matrix 50 to read the appropriate coordinate information.

According to the method of the invention therefore each aircraft is scheduled according to the best available schedule for its flight along a particular route; and once this schedule has been assigned, continuous control is effected because the operator, or automatical control, switches an associated synchronizing pulse to the respective tracking circuit so that its coordinate information is read at the proper schedule time with respect to signal $St$. Thus continuous error signals are generated to indicate whether the aircraft, so assigned on a particular available schedule, remains on its schedule; thus permitting the relaying of control or instructions to correct the error.

From the description thus far it should now be apparent that the invention provides a novel method for scheduling and controlling aircraft to fly along fixed air routes according to respective schedules. The technique of the invention provides continuous error signals indicating any deviation of the actual remaining flight time for the aircraft to its destination from the scheduled flight time. This error signal may be employed to provide correction information or, in an automatic system, may be telemetered to the aircraft to effect an automatic control.

It will be noted that the invention contemplates a system wherein wind correction may be accomplished to insure the proper scheduling of the aircraft, by correcting for the wind velocities along each route leg. The wind correction computer for each leg may be a very simple circuit such as a linear potentiometer which receives the distance to go signal $dg$, of the leg, and produces an output signal at a variable tap which is controlled in accordance with the wind data. This may be accomplished by moving the tap by means of a wind data synchro resolver.

While the basic method of the invention may be practiced by the manual operation of various instruments, in practice the problem becomes too complex for the operator to do so and accordingly an automatic technique is preferred. The general form of the switching control which may be required for such an automatic system is shown in FIG. 3. The particular types of switching networks are not shown since such are now well known in the art. It will be understood, of course, that the illustration of FIG. 3 is not intended to limit the invention to the particular switching technique shown.

In FIG. 3 a simplified system is illustrated wherein four tracking circuits are coupled to matrix 50 which is shown as containing gating circuits 51, 52, 53 and 54. Circuit 51 is typical of the type of gating circuit which may be employed and will be noted to include a diode switching network of conventional type which is arranged to pass input signals such as R and $\theta$ only when the control signal $T_1$ is received. Gating circuits 52, 53 and 54 receive control signals $T_2$, $T_3$ and $T_4$, respectively. The output signals of matrix 50 are applied to matrix 60 which is controlled by route memory 70. In this case memory 70 may conveniently be a magnetic drum memory which is synchronized with the system timing pulses so that the output signal codes thereof correspond respectively to the particular program pulse which is produced at the time. That is, when program pulse $P_1$ is produced, memory 70 produces a code which identifies the route of the aircraft which is on that schedule.

In another variation of the invention memory 70 may be a series of relay storage banks, each of which is set according to the code identifying the route for the associated program pulse. Once a bank is set, the program pulse will pass through this bank to select the proper route computer. In this case then matrix 60 and memory 70 are effectively combined.

When memory 70 is a magnetic drum, matrix 60 may appropriately be a pyramid type of selection matrix. In this case each binary digit of memory 70 controls a different level of the matrix gating. In particular, a switch 61 receives timing pulse $T_p$ and is effective to produce either of two output signals depending upon the value of the first binary digit read from memory 70. If the digit is one, it may be assumed that an output pulse passed to switch 62–1; if zero, an output pulse goes to switch 62–2. In a similar manner the second binary digit of the code signals of memory 70 is applied to switches 62 so that each produces a first output signal for a binary digit representing one and a second output signal for a binary digit representing zero. Finally the four output signals produced by switches 62 control four corresponding switches 63 which produce eight route selection signals for controlling respective output switches 64, each of which receives the coordinate data signals passed through matrix 50. The signals passed through the selected switch 64 are applied to the associated route computer 80.

Typical forms for computers 80 will be considered below. Summation amplifiers 100 and difference circuits 110 may be conventional and are therefore not considered in detail herein. It will be understood that if the schedule time remaining signal is a negative signal, it may be combined in amplifiers 100, thus obviating the necessity of difference circuits 110. Switches 140 may be similar to switch 51.

Schedule decision circuit 150 may vary in form depend upon the particular application of the invention. In fact this circuit is not necessary where the operator makes the schedule decision by comparing the actual and scheduled remaining times to fly. As an illustration of one suitable form of the circuit, block 150 is shown in FIG. 3 to comprise a comparator 151 which receives the various signals from switches 140 and compares them to a reference signal. The reference signal indicates the range of schedule error which an aircraft may assume. The value of the reference is determined on the basis of information indicating whether or not the aircraft can get on schedule after assuming the reservation. Assurance must be given that the aircraft will not be dangerously close to another. It may be assumed for the conventional air traffic situation that a one minute separation between aircraft will be satisfactory; so that perhaps a reference signal representing 10 seconds would be a safe error limit. This means that if the aircraft is within 10 seconds of a particular schedule, it may be assigned that schedule. The one minute separation between aircraft means ten miles for a jet travelling at six hundred miles per hour, or five miles for an aircraft travelling at three hundred miles per hour.

Output circuit 130 may comprise two comparators 131 and 132 receiving speed-low and speed-high reference signals, respectively. When the speed-low signal is exceeded, an output signal is produced indicating that the pilot of the respective aircraft should increase his speed, and when the speed-high signal is exceeded, an output signal is produced indicating that the pilot should decrease his speed.

Schedule memory 160 may comprise a series of rotary switches 161, 162, 163 and 164 for producing output signals $T_1$, $T_2$, $T_3$ and $T_4$, respectively. Each rotary switch receives the four program pulses $P_1$, $P_2$, $P_3$ and $P_4$ through switching circuits 165, 166, 167 and 168. Switches 165 through 168 receive the control signal produced by decision circuit 150 and are arranged to remain in a particular switching state designated by the output signal of circuit 150 until receiving a different signal. That is, once a decision has been made to assign a particular schedule and associated program pulse to a tracking circuit, the associate switch is set and then provides an inhibit pulse for schedule availability indicator 180. In the illustrative case of FIG. 3, circuit 180 is indicated to be differential-type of amplifier which receives timing pulse $T_p$ at the grid of one tube 181 and produces an output pulse at the anode thereof whenever an inhibit pulse is not applied to the grid of a second tube 182. Thus no timing pulse passes through circuit 180 unless the inhibit pulse is absent which means that the particular program pulse has not been assigned to any aircraft for its scheduling.

In operation then the operator may either manually, or through the actuation of an automatic control, set the rotary switches to positions where program pulses are available and where decision circuit 150 indicates that error between the actual and schedule time for arrival is small enough to permit the schedule assignment. Once the assignment is made, the particular rotary switch remains stationary and inhibit pulses are gated through to circuit 180 to prevent another assignment to this schedule until the aircraft so assigned has reached its destination. At this time provision can be made for releasing the associated switch in circuit 160. This may be effected by detecting the coincidence between a program pulse and the zero signal of circuit 120, indicating that the schedule if previously filled has now been completed.

It should be understood, of course, that the rotary switch type of memory may be replaced with a higher speed memory which may be operated to permit the random access to any schedule to determine whether or not it is available.

It is important to note again that each of the various circuits in FIG. 3 may be operated manually, and that the memories may be manually controlled selection switches which the operator can set by hand. The various measurements may be made by the operator with appropriate instruments who may also replace decision circuit 150. Thus the method of the invention is not limited to an automatically operated system but lies in the general technique for assigning time schedules to a plurality of aircraft and for then providing continuous information indicating any discrepancy between the scheduled time remaining for the flight and the actual remaining time considering the route, wind, distance and type of aircraft.

While the analogue computer required for the route computation may assume a multitude of different forms, it is preferred to design these circuits for simplicity and time sharing capability. In order to accomplish these aims, it is preferable to select route length defining equations which do not require the explicit multiplication of two variables.

The manner in which this may be accomplished will be illustrated with reference to FIG. 4 wherein the following geometry is assumed, namely:

The flight path is indicated by the arrows along legs B and A.

The distance to fly (ground measurement) $=d_g=B+A$.

Tracking units 20 provide aircraft positions as R (volts) and $\theta$ (volts) referred to touch down as origin.

Measurement of $\theta$ is clockwise from the direction of leg A.

To simplify the discussion the special case is chosen wherein legs A and B are perpendicular to each other.

To solve for $d_g=B+A$ in terms of R and $\theta$ without multiplication of two variables, we may write $d_g$ as the sum of range plus an unknown function of $\theta$. We have therefore $$d_g=R+f(\theta)$$

also $$d_g=B+A$$

From the above we obtain by subtraction:

$$f(\theta)=B+A-R$$

"A" is a constant whose value is easily determined and we may, therefore, write B and R in terms of A and the angle $\theta$.

$$B=A \tan \theta$$

$$R=A \sec \theta$$

Accordingly, $$f(\theta)=A(\tan \theta+1-\sec \theta)$$

or $$d_g=R+A(\tan \theta+1-\sec \theta)$$

The $\theta$ dependent function above is a simple curve as shown in FIG. 5. The initial slope of this curve is seen to be 1.0 and the final slope is 0.5. Because of the relatively small slope change it can be mechanized to above ⅓ of 1% accuracy by applying the angle voltage from the tracking unit to a three branch function diode generator as shown in FIG. 6.

In FIG. 6 the constant A is inserted via a fixed setting of an output potentiometer. The circuit of FIG. 6 is arranged so that each diode branch approximate a portion of the curve of FIG. 5. The technique for accomplishing the desired curve fitting in this manner is now well known and will not be considered further.

The general technique of equation definition permitting linear summations in this manner may be extended to any number of legs, or any angle of intersection. For example, if legs A and B intersected at 100° a perpendicular leg, a prime may be drawn and a second function $f(\theta_0)$ may be defined to satisfy the relationship:

$$d_g=R+f(\theta)-f(\theta_0)$$

In a similar manner various others legs may be computed and combined in a linear manner to determine the entire route length. The general form of a two-leg summation network is indicated in FIG. 7, wherein function generators 83 and 84 produce respective functions $f_1(\theta)$ and $f_2(\theta)$, respectively. These functions may then be combined in a conventional summing network 85 and then added to a function of range signal R to produce the desired output signal $d_g$.

Each of the function generators in FIG. 7 may be of the type shown in FIG. 6 and is biased so that its output signal remains constant at the maximum leg length after the aircraft leaves that leg and goes to the next leg. Thus signal $d_g$ represents the summation at any time of all completed leg lengths and any partial leg length which is presently occupied. The profile computer mentioned above may be a function generator of this type and is combined with the normal leg computers to modify the leg signals for special aircraft flight paths.

The general principle of $f(\theta)$ function generating may be extended to any coordinate system. In X and Y coordinates, the distance $d_g$ is always a linear function of the coordinate data. If the path is approximately parallel to the X axis $d_g$ is a function of X alone; if parallel to the Y axis, it is a function of Y alone. In addition, many simplifications are possible in $f(\theta)$. For example, distance $d_g$ is a linear function $\theta$ alone when a path of constant radius R. Simplifications in terms of R alone are also possible.

From the foregoing description, it should now be apparent that the present invention provides an efficient solution to the fixed-route air traffic control problem which may occur in the case of the civil air ways or in military applications involving approaches to a plurality of airdromes. While in the typical case aircraft will be scheduled along one or several fixed air routes to a common destination point which is on the ground; the expression "common destination point" may signify a known point of intersection of various routes in space. In this case, the scheduling of the various aircraft may be accomplished by referencing the scheduled time to arrive to the point of intersection.

The general method of the invention has been illustrated with respect to particular circuits which are appropriate for its practice. However, it has been stated and is emphasized here again that the method may be accomplished by a series of manual controls effected by an operator and is in no manner limited to any of the circuits illustrated.

Various circuit techniques have been described which are preferred for use in the apparatus form of the invention. The simple analogue computing technique described herein is preferred for economy and makes it feasible to duplicate or triplicate each leg computation to insure error-free operation. Furthermore, these computers are readily operated on a time-sharing basis to reduce the complexity of the overall system, even though over 100 aircraft may be controlled simultaneously.

However, where cost permits, a digital computer may be employed advantageously in lieu of the various analogue computers described herein. In this case, the program for operating the digital computer serves the function of the plurality of computers described herein. Thus, the mention of a plurality of computers in the specification and claims herein is intended to be generic to the use of either analogue computers or a digital system which is programmed to accomplish the same function.

It will be understood that the basic concept of the invention is generic to a wide variety of systems or methods embodying the general concepts taught herein. And it is expected that those skilled in the art will devise many variations which are nevertheless covered by the appended claims.

What is claimed is:

1. In an air traffic control system in which an aircraft is scheduled to arrive at a predetermined point on a fixed flight route at a predetermined time, a ground station for causing the aircraft to adhere to its scheduled position along the route throughout its flight, said ground station comprising: first means for periodically determining the position of the aircraft; second means, coupled to said first means, for computing the remaining actual time of flight of the aircraft along its fixed route from its predetermined position to the predetermined point on the scheduled route; third means for continuouly producing a signal uniquely related to said aircraft to continuously represent the scheduled time of flight remaining for said aircraft; and schedule error means for indicating the difference between the actual time of flight and the scheduled time of flight.

2. The ground station defined in claim 1, wherein said second means includes at least first and second computing elements for producing first and second signals representing the distance to go along first and second legs of the scheduled flight route.

3. The ground station defined in claim 2, wherein said second means further includes means for translating said distance to go signals into actual time remaining signals, and means for combining said actual time remaining signals into a composite signal used in said schedule error means to indicate said difference.

4. The ground station defined in claim 1 which further includes signal generating means for periodically producing a synchronizing signal for each of the aircraft to be guided, each synchronizing signal being operable through said second and third means to select a scheduled time remaining signal amplitude corresponding to the remaining scheduled time for the respective aircraft along its fixed route.

5. An air traffic control system for causing $n$ aircraft to adhere to their scheduled flight times throughout a significant portion of their respective flights, said $n$ aircraft being scheduled to fly along $m$ predetermined flight routes to a common destination, each of said routes including a plurality of linear leg sections preset according to a civil airway designation, each of said scheduled flight times being also preset, said air traffic control system comprising: first means for periodically determining the positions of the $n$ aircraft; second means, including $m$ flight route computers, for computing the actual remaining times of flight of the $n$ aircraft from their determined position along their respective scheduled routes to said common destination, each flight route computer including a plurality of leg computers for producing respective signals representing the actual distance remaining to go along the particular leg of said route, and means for combining all distance to go signals for said legs to produce said actual remaining times of flight; third means, operable in synchronism with said second means, for presenting the scheduled remaining times of flight of the $n$ aircraft; and schedule error means for indicating the difference between the actual remaining time of flight and the scheduled time of flight of each of the $n$ aircraft.

6. The traffic control system defined in claim 5 wherein $m$ is an integer less than $n$, and which further includes signal generating means for periodically generating a series of $n$ synchronizing signals, corresponding to the $n$ aircraft, respectively; and means responsive to each synchronizing signal for actuating the flight route computer associated with the corresponding aircraft.

7. The traffic control system defined in claim 6, which further includes means, responsive to each occurrence of each of said synchronizing signals, for coupling the tracking system corresponding to the synchronizing signal to the associated flight route computer.

8. The traffic control system defined in claim 5, wherein each of said predetermined flight route computers includes at least first and second computing elements for computing first and second times of flight along first and second legs, respectively, of the flight route.

9. The traffic control system defined in claim 8, wherein each of said flight route computers further includes means for combining the times of flight computed by said computing elements.

10. The traffic control system defined in claim 9, wherein each of said computing elements includes fixed computing means for computing time as a function of the air speed of the associated aircraft, and adjustable computing means, responsive to the time computed by said fixed computing means, for computing time as a function of the ground speed of the associated aircraft.

11. The traffic control system defined in claim 10 which further includes a wind data resolver for simultaneously adjusting the adjustable computing means in said *m* flight computers in accordance with the prevailing wind conditions during the time of flight.

12. The traffic control system defined in claim 11, wherein said first means includes *n* automatic tracking systems corresponding to said *n* aircraft, respectively.

13. In an air traffic control system for controlling the flight of *n* aircraft scheduled to arrive at a common point at *n* predetermined times, respectively, and to fly along *m* fixed flight routes, each route including a plurality of legs having fixed directions and lengths, a flight route computing system comprising: *m* flight route computers corresponding to the *m* flight routes, respectively, each route computer including a plurality of leg computers for producing respective distance to go signals for each leg, and means for combining said distance to go signals to produce an actual remaining time to fly signal, selection means for initially actuating one of said computers to compute the time of flight of one of said aircraft scheduled to fly the route represented by said one computer from an initial point on said route to the common point; and synchronizing means for thereafter actuating said one computer to compute the remaining times of flight of said one aircraft for different positions along said route.

14. The flight route computing system defined in claim 13, wherein at least one of said flight route computers includes at least first and second computing elements for computing times of flight of an aircraft along first and second scheduled legs, respectively, of the route represented by the computer.

15. The flight route computing system defined in claim 14, wherein each of said flight route computers further includes means for combining the times of flight computed by said computing elements to produce an indication of said remaining time of flight.

16. The flight route computing system defined in claim 15, wherein each of said computing elements includes first computing means for computing time of flight as a function of the air speed of the associated aircraft, and second computing means, responsive to the time computed by said first computing means, for computing time of flight as a function of the ground speed of the associated aircraft.

17. The flight route computing system defined in claim 16, which further includes a wind data resolver for simultaneously actuating the second computing means in said *m* flight route computers in accordance with the prevailing wind conditions during the time of flight.

18. An air traffic control system for causing a plurality of aircraft to adhere to their scheduled flight times throughout a significant part of their flights along scheduled routes to a destination point, said system comprising: a flight route computing system for continuously computing the actual remaining times of flight of the aircraft from their instantaneous positions along the scheduled route to the destination point, said route computing system including a plurality of leg computers for producing respective signals representing the distance of a respective aircraft to go along the particular leg, and means for combining said signals to produce a signal representing said actual remaining time of flight for the respective aircraft; a timing device for continuously presenting the remaining scheduled time of flight of the aircraft, said timing device including a signal generator for producing a timing signal having a continuously varying amplitude to represent, in amplitude, scheduled time remaining, and means for continuously generating program pulses in cycles such that one program pulse is available for each aircraft to be selected for guidance and is positioned in time to identify the amplitude of said timing signal representing the then time remaining for the selected aircraft; and means for presenting the schedule error time between the actual times computed by said computing system and the corresponding remaining scheduled time presented by said device at the time of computation.

19. A system for controlling an aircraft so that it moves along a predetermined civil air route to arrive at a destination at a scheduled time, said system comprising: a remaining route length computer for producing a first signal indicating the distance along a predetermined, fixed civil airway route remaining between the aircraft position and the destination; a remaining time computer responsive to said first signal for producing a second signal indicating the amount of time required for the aircraft to complete its flight on the route considering its nominal air speeds and any wind vector effecting ground speed; a schedule-time computer for producing a third signal indicating the remaining schedule time; and control means responsive to said first, second and third signals for producing control signals indicating the corrections necessary to keep the aircraft on schedule on said route.

20. The system defined in claim 19 wherein first means are included for producing a fourth signal having a level indicating whether or not a schedule time is available for an aircraft and second means producing a fifth signal indicating that an available time schedule can be met by a particular aircraft.

21. The system defined in claim 20 wherein said first means includes a circuit for producing a synchronizing signal identifying an aircraft on a time schedule, the lack of a synchronizing signal at a particular time indicating that the scheduled time is available.

22. The system defined in claim 21 wherein there is included a decision circuit responsive to a signal indicating that a particular synchronizing signal is not assigned to any aircraft for comparing said second and third signals to and for producing said fifth signal indicating that the available time schedule can be met by the aircraft when the difference between the schedule time available and actual flight time available is small enough for the aircraft to correct therefor.

23. A system for causing a plurality of aircraft to adhere to their respective scheduled flight times throughout a desired portion of each of their flights along the respective scheduled routes, said system comprising: first means for producing a plurality of reservation interval signals representing in real time the remaining scheduled flight times for the plurality of aircraft, respectively, at various time positions of the aircraft along their scheduled flight routes; second means for producing a schedule error signal for each time position for each of the aircraft to indicate the error between the remaining scheduled flight time for the aircraft and the remaining actual time of flight, said second means including means for generating a signal representing said remaining actual time of flight as a function of the distance remaining to go for the respective aircraft along its scheduled route and its cruising speed referenced to ground; and third means for generating a correction signal for each aircraft in response to the respective schedule error signal to enable the aircraft to meet its schedule.

24. A system for scheduling an aircraft required to fly along a civil air route and to arrive at a destination on said civil air route at a scheduled time of arrival, said system also providing control information signals indicating the deviation of the aircraft from its time of arrival schedule, said system comprising: first means for producing a remaining time of flight signal, said first means including means for resolving the ground speed of the aircraft in response to signals representing wind vectors along the route and the air speed of the aircraft, and means for introducing signals representing the route directions; second means for continuously decreasing the scheduled time remaining for the flight of the aircraft to produce a scheduled time remaining signal; third means for producing a difference signal between said scheduled time remaining signal and said remaining time of flight signal; and fourth means for producing control information signals in response to said difference signal, said control information signals indicating the flight change to be made to correct said difference.

References Cited in the file of this patent

UNITED STATES PATENTS

| | | |
|---|---|---|
| 2,475,221 | Coley | July 5, 1949 |
| 2,787,428 | Schuck | Apr. 2, 1957 |
| 2,825,054 | Ernst | Feb. 25, 1958 |
| 2,844,817 | Green | July 22, 1958 |
| 2,927,751 | Daspit | Mar. 8, 1960 |